(12) United States Patent
Loh et al.

(10) Patent No.: US 6,681,883 B2
(45) Date of Patent: Jan. 27, 2004

(54) METHOD AND APPARATUS FOR SUPPRESSING VIBRATION IN VEHICLE A STEERING SYSTEM

(75) Inventors: Wei-Yi Loh, Novi, MI (US); Thomas Micheal Dalka, Sterling Heights, MI (US); Weiping Zhu, Canton, MI (US); Jiansheng Weng, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 10/063,020

(22) Filed: Mar. 12, 2002

(65) Prior Publication Data

US 2003/0173138 A1 Sep. 18, 2003

(51) Int. Cl.⁷ .................................................. B60D 1/62
(52) U.S. Cl. .................. 180/417; 180/421; 280/89; 280/90
(58) Field of Search .................. 280/89, 89.1, 90; 180/417, 421, 422

(56) References Cited

U.S. PATENT DOCUMENTS

| | | | | |
|---|---|---|---|---|
| 4,274,329 A | | 6/1981 | Weyer | |
| 4,351,228 A | | 9/1982 | Schultz et al. | |
| 4,352,304 A | * | 10/1982 | Warner | 280/90 |
| 4,391,342 A | * | 7/1983 | Nishikawa | 280/89 |
| 5,289,893 A | * | 3/1994 | Yamamoto | 180/132 |
| 5,404,961 A | * | 4/1995 | Huber | 180/132 |
| 5,542,343 A | * | 8/1996 | Martin | 91/375 R |
| 6,026,924 A | * | 2/2000 | Godek | 280/90 |
| 6,120,046 A | * | 9/2000 | Daly | 280/90 |
| 6,135,224 A | * | 10/2000 | Thomas | 180/78 |
| 6,176,342 B1 | | 1/2001 | Luibrand et al. | |
| 6,186,047 B1 | | 2/2001 | Baruffaldi | |
| 6,491,313 B1 | * | 12/2002 | Rui | 280/90 |
| 6,561,305 B2 | * | 5/2003 | Smith | 280/280 |
| 2002/0179361 A1 | * | 12/2002 | Ross | 280/89 |

* cited by examiner

*Primary Examiner*—Daniel G. DePumpo
(74) *Attorney, Agent, or Firm*—Gary A. Smith

(57) ABSTRACT

A system for reducing steering nibble and other vibrations in a power-assisted steering system increases the amount of damping force when a power steering boost system is applying little or no steering force to the steering actuator, and reduces the amount of damping force when the power boost system is applying significant steering force to the steering actuator. A damping member is formed of a polymer material and is urged into contact with the steering actuator by a spring-biased clamping member. A shuttle valve regulates pressure from the hydraulic steering boost system to overcome the spring biasing force whenever hydraulic pressure is applied to the steering actuator. The preload of the spring biasing mechanism is varied by an electronic control unit that receives inputs from a driver-activated switch, and from vehicle condition sensors to allow automatic, adaptive adjustment of the damping to optimize driving comfort and safety.

20 Claims, 4 Drawing Sheets

METHOD AND APPARATUS FOR SUPPRESSING VIBRATION IN VEHICLE A STEERING SYSTEM

BACKGROUND OF INVENTION

1. Field of the Invention

The present invention relates generally to power assisted steering systems such as are used in automotive vehicles, and more particularly to a method and apparatus for suppressing vibrations in the steering system that may otherwise be transmitted to the steering wheel.

2. Background

Automotive vehicle steering systems are subject to a large number of forces that may cause vibrations that are felt by the driver through the steering wheel. These undesirable steering wheel vibrations, commonly known as nibble, may be caused by brake roughness, tire/wheel imbalance, road input, or other excitations.

Since steering nibble is caused by excitations over a wide range of different frequencies, an effective engineering solution to the problem is very challenging. Previous efforts to eliminate nibble have focused on designing and tuning the elastomeric bushings, bearings, and joints used throughout the steering and suspension systems to achieve a desired level of vibration damping. Unfortunately, these efforts have had only limited success, and they often require compromises in other vehicle attributes such as ride, steering feel, rolling comfort, and impact harshness.

Oil-filled elastomeric bushings, also known as hydraulic bushings, are the primary type of bearing used to reduce suspension vibration caused by brake and tire/wheel systems. However, hydraulic bushings require a relatively large amount of packaging space, so that major structural and chassis system redesigns may be required to accommodate these components. Also, hydraulic bushings are expensive and not very durable.

U.S. Pat. Nos. 6,120,046 and 6,561,302 teach mechanisms that apply a torsional damping force to a steering shaft or column that connects a steering wheel to a steering assembly (such as a rack and pinion assembly). This torsional damping directly inhibits rotation of the steering wheel and therefore may have an undesirable effect on steering feel. Also, torsional damping of the steering wheel/ column assembly is unable to effectively damp vibrations if the amplitude of such vibrations is below the threshold of steering angular displacement necessary to activate a power assist system. This is most likely to be the case with higher frequency vibrations.

U.S. Pat. No. 6,491,313 teaches a variable hydraulic damper intended for attachment to a rack or center link of a steering system. The amount of damping provided by the device is varied by controlling the size of an orifice through which fluid flows between the opposite sides of a piston. The size of the orifice is varied in inverse proportion to the amount of hydraulic pressure being supplied to the power assisted steering system. This results in greater damping being applied to the steering system when a relatively low degree of power assist is called for (such as at higher vehicle speed and/or neutral steering wheel angle positions), and less damping being applied when a higher degree of power assist is called for (such as at lower vehicle speed and/or greater steering wheel angle displacement). This device overcomes the limitations inherent in torsional dampers pointed out in the paragraph above, but a hydraulic damper has its own inherent limitations in regards to the specific types of vibrations that it can effectively damp.

SUMMARY OF INVENTION

The present invention provides an effective means for reducing steering nibble and other vibrations in a power-assisted steering system without changing or compromising any other performance attributes of a vehicle's steering or suspension systems. In general, this is achieved by providing a damping member in close proximity to a steering actuator, and a damping control system operative to vary the force with which the damping member is urged against the steering actuator. The damping control system increases the amount of damping force when the power steering boost system is applying little or no steering force to the steering actuator, and reduces the amount of damping force when the power boost system is applying significant steering force to the steering actuator.

In this way, the steering actuator is damped to significantly reduce steering nibble whenever the driver of the vehicle is not providing any steering input to the steering system, as when the vehicle is tracking straight ahead or is in a constant radius turn. However, when the driver is providing steering input, as when turning the steering wheel, the steering actuator is substantially undamped so as not to interfere with the "driving feel" sensed by the driver through the steering wheel.

In a preferred embodiment of the invention disclosed herein, the steering actuator is enclosed by a housing and is moved relative to the housing along an axis by a hydraulic boost system in order to apply steering force. The damping member is formed of a polymer material, surrounds the steering actuator, and has a frustroconical outer surface. At least one clamping member is disposed between the damping member and the housing and is movable parallel to the steering actuator's axis of movement between a damping position wherein the clamping member is wedged between the inner surface of the housing and the outer surface of the damping member to urge the damping member against the steering actuator, and a released position wherein the clamping member does not urge the damping member against the steering actuator.

A spring biasing mechanism, which may be a coil spring, urges the clamping element toward the damping position, and a shuttle valve operates to regulate pressure from the hydraulic steering boost system, increasing the pressure in a chamber within the housing to overcome the spring force whenever hydraulic pressure is applied to the steering actuator.

According to another feature of the invention, the spring biasing mechanism is operative to allow the spring preload to be varied. This is preferably accomplished by an electronic control unit (ECU) that receives inputs from a driver-activated switch to allow the driver to select the amount of damping. The ECU may also receive inputs from one or more vehicle condition sensors, such as a vehicle speed sensor or a yaw rate/acceleration sensor, to allow automatic, adaptive adjustment of the degree of damping in accordance with a control algorithm designed to optimize driving comfort and safety.

Other features and advantages of the present invention will be readily appreciated and better understood after reading the subsequent description when considered in connection with the accompanying drawings.

DETAILED DESCRIPTION

Figure 1:
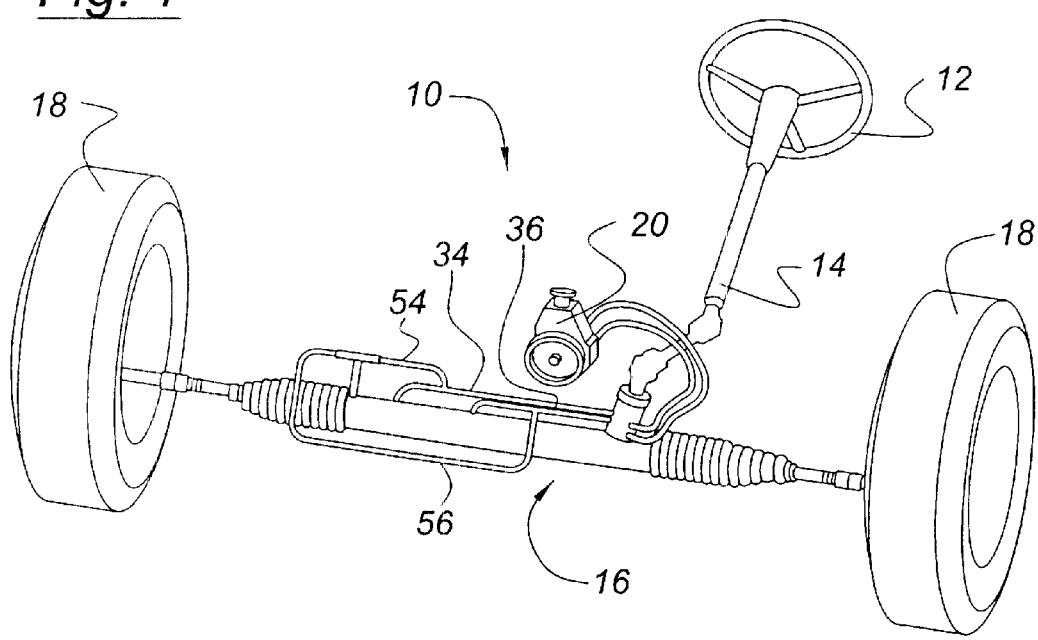
FIG. 1 is a schematic drawing of a hydraulically boosted rack-and-pinion steering system including a steering vibration suppression apparatus according to a preferred embodiment of the invention.

Referring to FIG. 1, a power steering system 10 for a vehicle includes a steering wheel 12, a steering column 14, and a hydraulically boosted rack-and-pinion steering gear 16 connected with steerable front wheels 18. A hydraulic pump 20 sends fluid pressure to the steering gear 16 when the steering wheel 12 is turned in order to provide power boost in a manner well known in the art.

Figure 2:
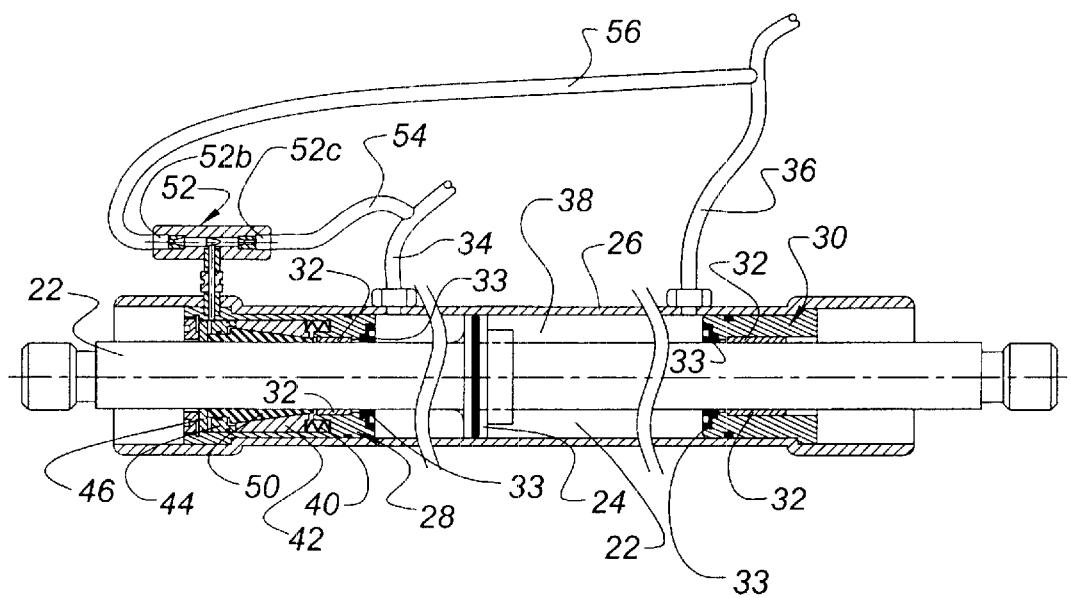
FIG. 2 is a cross-sectional view of the hydraulic cylinder portion of the system shown in FIG. 1 with the vibration suppression apparatus in a damped condition.

As best seen in FIG. 2, steering gear 16 includes a steering actuator shaft 22 and an attached piston 24 that travel axially within a housing 26. Opposite ends of shaft 22 are connected through appropriate linkages to wheels 18 so that movement of the shaft changes the steering angle of the wheels. Hubs 28,30 are located adjacent opposite ends of housing 26 and include journal bearings 32 to support shaft 22 for axial movement and oil seals 33. The space within housing 26 and between hubs 28,30 constitutes a hydraulic cylinder 38 that contains piston 24 and is supplied with hydraulic fluid from pump 20 via supply lines 34,36. When a vehicle driver (not shown) turns steering wheel 12 in a first direction, valves (not shown) in steering gear 16 cause hydraulic fluid to be forced through first supply line 34 into the left side of cylinder 38 and exhausted from the right side of the cylinder, thereby applying a steering force urging piston 24 and shaft 22 to the right. Similarly, when steering wheel 12 is turned in the opposite second direction, hydraulic fluid is forced through second line 36 into the right side of cylinder 38 and exhausted from the left side, thereby applying a steering force urging shaft 22 to the left.

Figure 3:
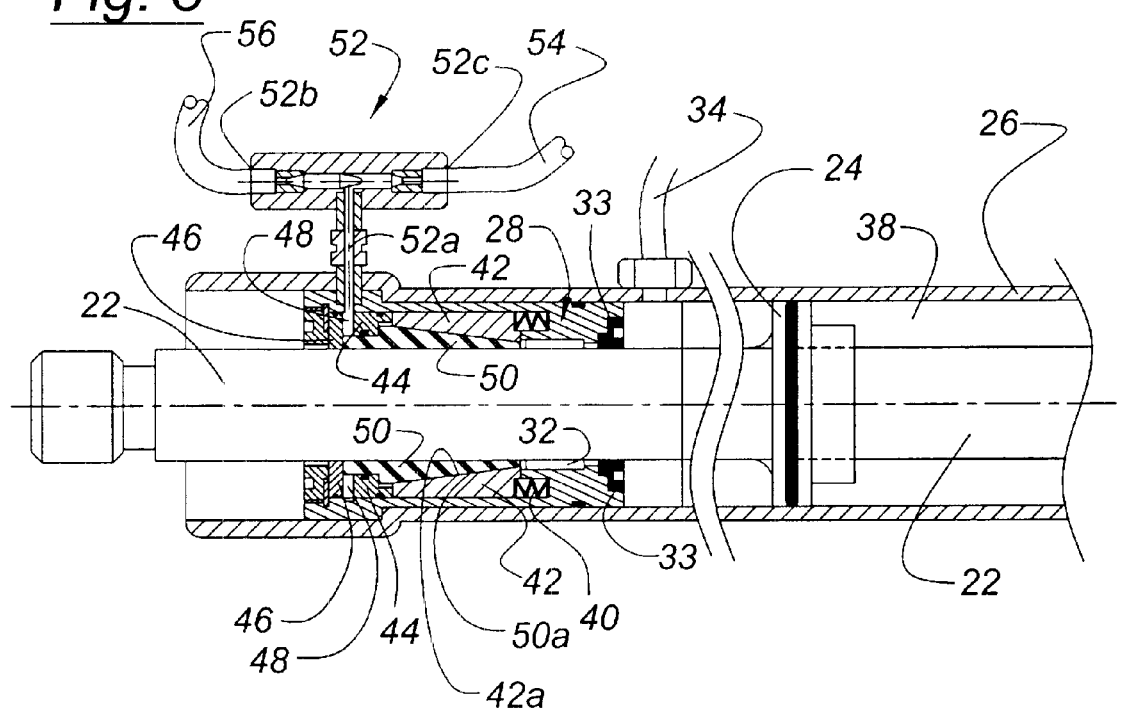
FIG. 3 is an enlarged view similar to that of FIG. 2, with the vibration suppression apparatus in a released condition.

One or more springs 40 are retained in pockets formed adjacent the right or inner end of hub 28. A clamping member 42 is disposed within hub 28 and is axially slidable with respect to the hub. Clamping member 42 may comprise a single generally annular component, or it may be a plurality of segments spaced around the circumference of hub 28. Springs 40 act on clamping member 42 to urge it leftward as viewed in FIGS. 2 and 3. Clamping member 42 preferably has a tapered inner surface 42a. An annular push plate 44 is disposed adjacent the left end of clamping member 42. The left end of hub 28 is closed off by a seat 46 to define an annular chamber 48 between the seat and push plate 44.

A damper 50 is located between shaft 22 and clamping member 42 and substantially surrounds shaft 22. Damper 50 may comprise a single generally annular component, or it may be a plurality of segments spaced around the circumference of the shaft 22. Damper 50 has a frustroconical outer surface 50a over most of its axial length, the taper angle of which matches the taper angle of the clamping member inner surface 42a. Damper 50 is formed from an elastically deformable material, such as a polymer. When damper 50 is undeformed, it fits loosely around shaft 22 so that the shaft can slide through the damper.

A shuttle valve 52 has an outlet opening 52a that communicates with chamber 48 inside of hub 28. First and second tap lines 54,56 extend from respective hydraulic supply lines 34,36 and connect with inlet openings 52b,52c of shuttle valve 52, thereby supplying hydraulic fluid from the power steering system to the shuttle valve. Shuttle valve 52 operates in a manner well known in the hydraulics art, passing fluid pressure from either first or second tap line through to the outlet opening 52a, depending upon which of the tap lines has a greater pressure.

When steering wheel 12 is maintained in a steady position, steering gear 16 operates such that there is no hydraulic pressure differential between the left and right sides of piston 24. In this steady state, shuttle valve 52 regulates the hydraulic pressure supplied via tap lines 54,56 such that a baseline pressure level is maintained within chamber 48. At this baseline pressure, springs 40 generate sufficient force to urge clamping member 42 and push plate 44 leftward to a damping position wherein the clamping member 42 is wedged between housing 26 and damper 50, thereby exerting a clamping force on the damper that urges the damper radially inward against shaft 22. The inner surface of damper 50 that contacts shaft 22 may be scored or otherwise textured to increase the grip that the damper 50 has on the shaft when it is clamped inward.

When the vehicle driver makes a steering input by turning steering wheel 12, steering gear 16 operates to increase the hydraulic pressure in either the first or second supply line 34,36, thereby applying force on either the left or right side of piston 24 as necessary to provide power boost urging shaft 22 in the desired direction. In this turning state, shuttle valve 52 regulates the hydraulic pressure supplied via whichever of tap lines 54,56 has the higher pressure such that the pressure level within chamber 48 increases above the baseline pressure level. At this increased pressure, the hydraulic force exerted on push plate 44 overcomes the force of springs 40 and clamping member 42 is urged to the right to a released position wherein the clamping force exerted by the clamping member on damper 50 is reduced or eliminated. Damper 50 is sufficiently resilient that it returns to its undeformed condition when the clamping force is released, allowing shaft 22 to slide freely with respect to damper 50 and housing 26 as necessary to steer the vehicle wheels 18. When clamping member 42 is in the released position, the damping system does not interfere with movement of steering actuator shaft 22 in a manner that adversely affects the performance or steering "feel" of the steering system.

Damping system performance parameters, such as the amount of inward force exerted on shaft 22 by damper 50 during the steady state and the amount of hydraulic pressure required to reduce the damping during the turning state, are tuned by adjusting various design factors of the system. These design factors include the spring force, spring preload, the baseline pressure level in chamber 48, and the physical properties of damper 50. The system performance parameters are tuned to provide effective damping of mechanical vibrations experienced by the steering actuator shaft 22 and that may be transmitted to steering wheel 12.

While coil springs 40 are shown as providing the damping force in the depicted embodiment, any appropriate type of spring biasing mechanism may be used to urge damper into contact with shaft 22, such as plate springs or pneumatic springs.

Figure 4:
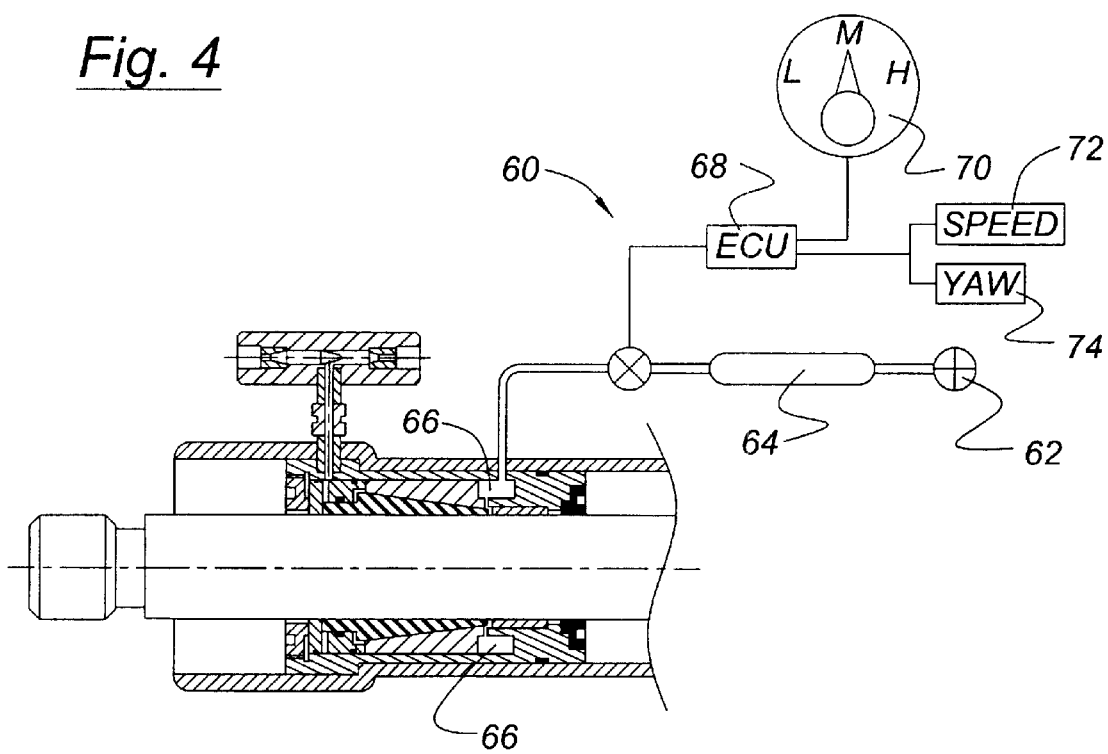
FIG. 4 is a schematic view of an electronically variable spring biasing system.

It may be advantageous to allow certain properties of the spring biasing mechanism (such as pre-load and/or spring rate) to be varied or adjusted during operation of the vehicle. As seen in FIG. 4, this may be accomplished by a pneumatic system 60 wherein a gas pressure source, such as a pump 62 and/or a pressure reservoir 64, is connected to a pneumatic spring 66 positioned within hub 28 to urge clamping member 42 to the damped position. An electronic control unit (ECU) 68 varies the amount of gas pressure supplied to pneumatic spring 66, thereby varying the amount of spring force applied to clamping member 42. ECU 68 may receive inputs from a driver-operated switch 70, allowing the driver to control the degree of damping. ECU 68 may also receive inputs from one or more vehicle condition sensors (such as a vehicle speed sensor 72 and/or a yaw rate sensor 74), thereby allowing automatic, adaptive adjustment of the degree of damping in accordance with a control algorithm designed to optimize driving comfort and safety. ECU 68 may be in electronic communication with or otherwise integrated with other vehicle dynamics computers (not shown) as part of an integrated vehicle dynamics control system.

Other means for and methods of providing a variable and/or adaptive spring control system will be apparent to a person of skill in the arts, such as an electromagnetic system or a magneto-rheological system.

The hydraulic power steering system described and depicted herein is only one possible type of power boost systems. A damping system for use with other types of power boost systems is also within the scope of the present invention. For example, a system using an electric motor to provide power boost to a steering actuator may be adapted to include the invention vibration damping system by providing damper actuators that are electrically powered. The electrically powered damper actuators receive electric power and/or control signals in coordination with the signals to the electric motor so that damping force is increased when the electric motor is not applying steering force to the steering actuator and reduced when the electric motor is applying steering force.

While the best modes for carrying out the invention have been described in detail, those familiar with the art to which this invention relates will recognize various alternative designs and embodiments for practicing the invention as defined by the appended claims.

What is claimed is:

1. A power-assisted steering system for a wheeled vehicle comprising:
    a steering actuator movable along an axis to control a steering angle of at least one wheel;
    a power boost system operative to apply steering force to the steering actuator to change the steering angle;
    a damping member adjacent the steering actuator;
    a damping control system operative to apply a damping force urging the damping member against the steering actuator and thereby inhibit movement of the steering actuator along the axis when the power boost system is not applying steering force to the steering actuator, and to reduce the damping force when the power boost system is applying steering force to the steering actuator.

2. The apparatus recited in claim 1 wherein the damping control system comprises a clamping member disposed adjacent the damping member and movable between a damping position wherein the clamping member urges the damping member against the steering actuator to generate the damping force, and a released position wherein the clamping member does not urge the damping member against the steering actuator.

3. The apparatus recited in claim 2 wherein the damping member substantially surrounds the steering actuator and has a frustroconical outer surface, and the clamping member is movable parallel to the axis such that the clamping member contacts the outer surface.

4. The apparatus recited in claim 3 wherein the damping member is made of a polymer material.

5. The apparatus recited in claim 1 wherein the the damping member substantially surrounds the steering actuator, and the steering actuator is free to slide through the damping member when the damping force is reduced.

6. The apparatus recited in claim 1 wherein the power boost system is a hydraulic system.

7. The apparatus recited in claim 6 wherein the damping control system comprises a shuttle valve operative to regulate pressure from the hydraulic system in order to increase and decrease the damping force.

8. The apparatus recited in claim 1 further wherein the damping control system comprises a spring biasing mechanism operative to apply the damping force.

9. The apparatus recited in claim 8 wherein the spring biasing mechanism is operative to allow varying of a spring preload.

10. The apparatus recited in claim 9 further comprising an electronic control unit operative to adjust the spring preload.

11. The apparatus recited in claim 10 wherein the electronic control unit receives inputs from at least one of a driver-operated switch and a vehicle condition sensor.

12. A power-assisted steering system for a wheeled vehicle comprising:
    a steering actuator movable along an axis to steer at least one wheel;
    a power boost system operative to urge the steering actuator;
    a housing enclosing at least a portion of the steering actuator and having an inner surface oriented toward the steering actuator;
    a damping member disposed between the steering actuator and the housing and having an outer surface oriented toward the housing;
    a clamping member disposed between the damping member and the housing, the clamping member movable parallel to the axis between a damping position wherein the clamping member is wedged between the inner surface of the housing and the outer surface of the damping member to urge the damping member against the steering actuator, and a released position wherein the clamping member does not urge the damping member against the steering actuator; and
    a control system operative to move the clamping member to the released position when the power boost system is urging the steering actuator along the axis, and to move the clamping member to the damping position when the power boost system is not urging the steering actuator along the axis.

13. The apparatus recited in claim 12 wherein the damping member substantially surrounds the steering actuator and has a frustroconical outer surface, and the clamping member is movable parallel to the axis such that the clamping member contacts the outer surface.

14. The apparatus recited in claim 12 wherein the power boost system comprises a hydraulic pump, and wherein the control system is operative to apply pressure from the hydraulic pump to move the clamping member to the released position when the hydraulic pump is urging the steering actuator along the axis.

15. The apparatus recited in claim 12 wherein the control system comprises a spring biasing mechanism operative to urge the clamping member to the damping position.

16. The apparatus recited in claim 15 wherein the spring biasing mechanism is operative to allow varying of a spring preload.

17. A method of suppressing vibration in a wheeled vehicle steering system having a steering actuator movable along an axis to steer at least one wheel and a power boost system for applying a steering force to move the steering actuator, the method comprising the steps of:

generating a damping force urging a damping member into contact with the steering actuator and thereby inhibit movement of the steering actuator along the axis to suppress vibration of the steering actuator when the power boost system is not applying the steering force; and reducing the damping force when the power boost system is applying the steering force.

18. The method recited in claim 17 wherein the step of generating a damping force comprises urging a clamping member to a damping position wherein the clamping member is wedged between the damping member and a surface spaced from the damping member.

19. The method recited in claim 17 wherein the step of generating a damping force is performed by a spring biasing mechanism.

20. The method recited in claim 17 wherein the step of reducing the damping force comprises utilizing hydraulic pressure from a hydraulic power boost system to overcome the damping force.

* * * * *